United States Patent
Crawford et al.

(10) Patent No.: US 6,827,076 B2
(45) Date of Patent: Dec. 7, 2004

(54) QUICK START BARBECUE

(75) Inventors: Alan D. Crawford, Burbank, CA (US); Robert A. DeMars, Woodland Hills, CA (US)

(73) Assignee: Original Ideas Inc., Calabasas, CA (US)

( * ) Notice: Subject to any disclaimer, the term of this patent is extended or adjusted under 35 U.S.C. 154(b) by 0 days.

(21) Appl. No.: 10/359,804

(22) Filed: Feb. 7, 2003

(65) Prior Publication Data

US 2004/0154603 A1 Aug. 12, 2004

(51) Int. Cl.$^7$ ................................................. A47J 37/00
(52) U.S. Cl. ................... 126/25 R; 126/25 B; 126/154; 126/242
(58) Field of Search ............................. 126/25 R, 25 A, 126/41 R, 9 R, 242–245, 25 B, 154, 152 A, 152 B; 431/345

(56) References Cited

U.S. PATENT DOCUMENTS

| | | | | |
|---|---|---|---|---|
| 1,859,432 A | * | 5/1932 | Louis ........................... | 126/242 |
| 1,978,747 A | * | 10/1934 | Glenn ........................... | 126/242 |
| 3,209,743 A | | 10/1965 | Stewart et al. | |
| 3,841,299 A | | 10/1974 | Tomita | |
| 3,865,052 A | * | 2/1975 | Streets et al. .............. | 126/25 B |
| 3,915,145 A | | 10/1975 | Tomita | |
| 4,281,633 A | | 8/1981 | Wackerman | |
| 4,422,435 A | * | 12/1983 | Spell ........................... | 126/25 B |
| 4,587,947 A | * | 5/1986 | Tomita ........................ | 126/25 R |
| 4,603,679 A | | 8/1986 | Ogden | |
| 5,086,752 A | | 2/1992 | Hait | |
| 5,154,159 A | | 10/1992 | Knafelc et al. | |
| 5,213,075 A | * | 5/1993 | Stephen et al. ........... | 126/25 B |
| 5,469,835 A | | 11/1995 | Stephen et al. | |
| 5,638,807 A | | 6/1997 | Flamenbaum | |
| 5,875,772 A | | 3/1999 | Saey | |
| 5,996,572 A | | 12/1999 | Ilagan | |
| 6,000,389 A | * | 12/1999 | Alpert ......................... | 126/25 R |

* cited by examiner

Primary Examiner—James C. Yeung
(74) Attorney, Agent, or Firm—Hogan & Hartson, LLP

(57) ABSTRACT

A quick start barbecue comprises a kettle, column and base. A moveable charcoal grate, when lowered into the column, folds into a basket shape thereby holding the charcoal in a compact configuration ideal for starting. Once the charcoal has ignited the grate is lifted into the kettle and in the process unfolds into a flat shape with the charcoal evenly distributed in a configuration ideal for cooking. The charcoal may be started using crumpled newspaper placed below the charcoal grate in its lower "basket" position or by use of a self igniting propane torch removably affixed to the column. A long chimney may be placed in the kettle to aid starting and stored around the column. A removable ash drawer in the base makes cleanup easy. Removal of the ash drawer causes a gate to close so that excess ash is confined to the column while the drawer is out.

26 Claims, 8 Drawing Sheets

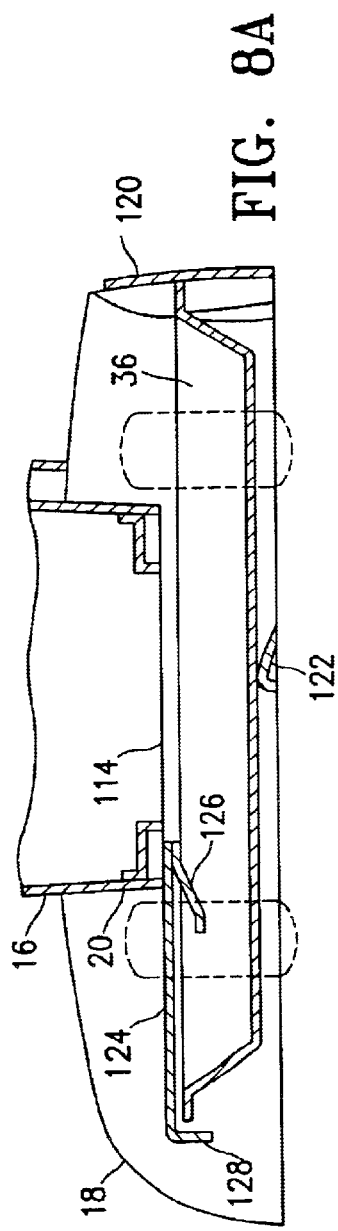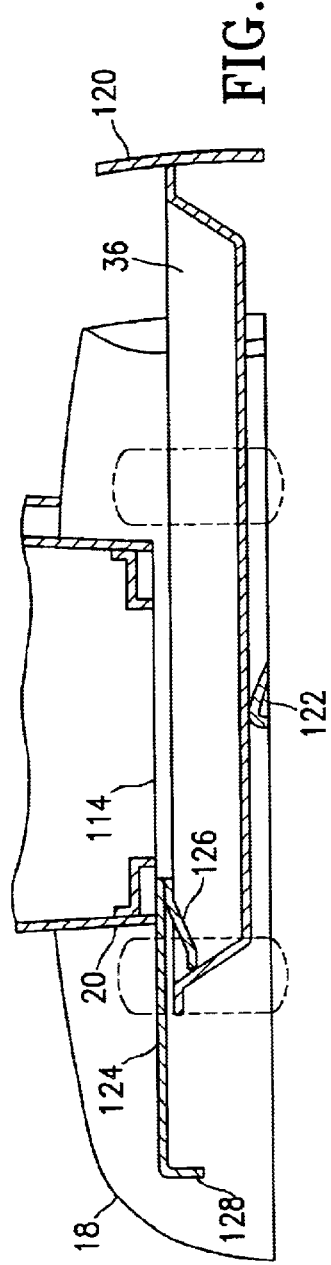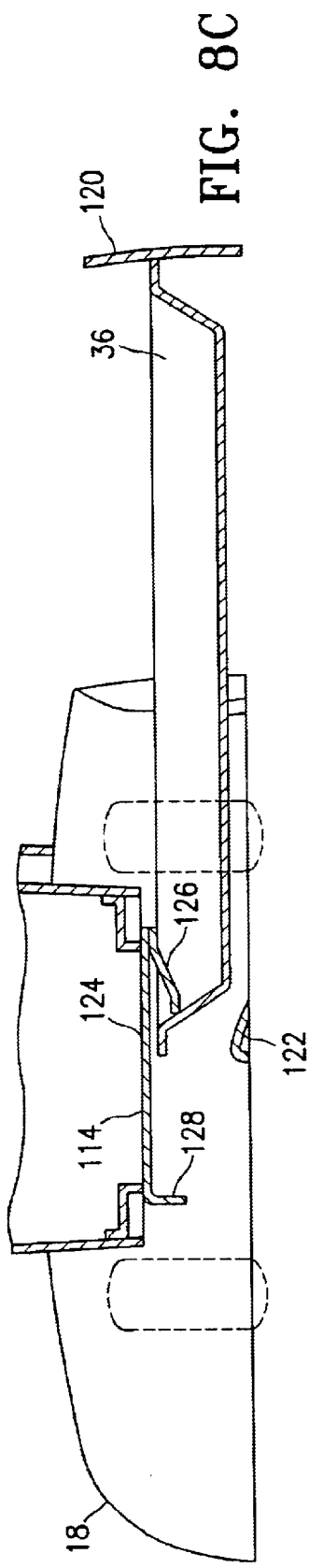

QUICK START BARBECUE

BACKGROUND OF THE INVENTION

1. Field of the Invention

The present invention relates to barbecues for cooking, and more particularly to barbecues of the type in which charcoal in briquette or similar form is used as the source of heat for the barbecue.

2. History of the Prior Art

Barbecues which use charcoal in briquette or similar form as the source of cooking heat are well known. Charcoal fueled barbecues provide the advantage that a gas hookup or, alternatively, a large and cumbersome propane tank, are not needed. In particular, charcoal barbecues are ideally suited for remote outdoor locations such as for picnics. Many such barbecues are portable and light weight, enabling them to be transported, such as by car, to the location where they are to be used for cooking. Upon setup of the barbecue, a desired quantity of charcoal is loaded into the barbecue and is ignited, causing the charcoal to burn. When the charcoal is capable of generating sufficient cooking heat, the food to be cooked is typically placed on a cooking grate disposed above the charcoal. When the cooking is finished, the ash generated by the burnt charcoal is disposed of in preparation for the next use of the barbecue.

One problem with charcoal barbecues is getting the charcoal to start and burn quickly so that cooking may commence without substantial delay. To accelerate the process of starting the charcoal, a number of arrangements and techniques have been devised. Typically, the charcoal is ignited while confined in a small container so as to concentrate the heat in a small volume. The charcoal may, for example, be placed in a can-shaped structure positioned above an igniter. When the charcoal is ready for cooking, it is typically spread onto a charcoal grate beneath the cooking grate. In some cases the can-like structure is lifted and turned upside down so as to dump the charcoal onto the charcoal grate, as shown, for example, by U.S. Pat. No. 5,469,835 of Stephen et al. In still other cases, mechanisms are provided for spreading the charcoal from the can-like structure onto the charcoal grate, as shown, for example, by U.S. Pat. No. 4,603,679 of Ogden, and by U.S. Pat. No. 5,638,807 of Flamenbaum. However, such arrangements leave much to be desired in terms of the lack of ease with which the charcoal can be ignited and initially burned while in a small and confined container and then easily spread onto a charcoal grate.

In U.S. Pat. No. 5,154,159 of Knafele, for example, the charcoal is started on an elevator platform which is then raised to a charcoal grill. However, the platform must then be rotated in order to distribute the charcoal over the separate and much larger charcoal grill.

In some cases, a chimney may be provided over the charcoal container in order to promote convection and cause the charcoal to burn faster. Such chimneys must be removed when not in use, typically requiring that they be separately carried and stored.

The charcoal is typically ignited using newspaper or other disposable flammable material. Sheets of newspaper are wadded up and placed under the charcoal. The paper is then set on fire using a match, and the burning paper ignites the charcoal. Paper ignition is shown by U.S. Pat. No. 3,209,743 of Stewart and U.S. Pat. No. 3,841,299 of Tomita. Still other forms of charcoal ignition such as a propane igniter may be used. In any case, however, it would be desirable to provide an arrangement in which paper can be used as the ignition source and, alternatively, in which a propane igniter can be readily coupled to the barbecue to serve as the ignition source.

Disposal of the residual ash and unburned portions of the charcoal after the cooking is finished can be a further problem. Simply turning the barbecue over and dumping the ash and charcoal residue can be cumbersome and messy, if not a fire hazard. Therefore, some barbecues are provided with an ash fallout system as shown, for example, by U.S. Pat. No. 3,915,145 of Tomita. Still others provide an ash drawer or other collection apparatus at the bottom thereof, as shown, for example, by U.S. Pat. No. 5,996,572 of Hagan. The barbecue is desirably designed so that ash and unburned portions of the charcoal fall down into the ash drawer. This may require open passageways from the charcoal grate down to the ash drawer so that the ash may fall down into the drawer unimpeded. In this connection it would be desirable to be able to scrape and otherwise manipulate the charcoal grate and the inner walls of the kettle or other cooking chamber at the top of the barbecue so as to agitate and dislodge the ash and charcoal and cause it to fall down into the ash drawer.

The ash drawer itself should desirably be designed so that the bottom of the barbecue just above it is closed off and sealed when the ash drawer is removed for disposition of its contents. When the drawer is again installed, the area above the drawer must be opened so as to receive the falling ash.

BRIEF DESCRIPTION OF THE INVENTION

Briefly stated, the present invention provides a quick start barbecue which has a housing with a cooking compartment therein and a cooking grate mounted in the cooking compartment. A foldable charcoal grate is positioned below the cooking grate and is movable between a lower position in which the charcoal grate folds to form a basket for charcoal and an upper position in which the charcoal grate unfolds to form a relatively flat grate for charcoal beneath the cooking grate. An actuator mechanism selectively moves the charcoal grate between the lower and upper positions. Igniting apparatus mounted below the charcoal grate ignites charcoal contained within the charcoal grate while it is in the lower position.

With the charcoal grate folded to form a basket in the lower position, the basket is filled with charcoal and the igniting apparatus is used to light the charcoal. When the charcoal is sufficiently hot and ready for cooking, the actuator mechanism is used to raise the charcoal grate to the upper position in which it unfolds so as to form a relatively flat grate for the charcoal beneath the cooking grate. Cooking may then be carried out.

The charcoal grate may comprise a central hub with a plurality of wire loops configured like flower petals pivotally coupled thereto and extending outwardly therefrom in a circular array. The petals pivot upwardly relative to the hub to form a basket for the charcoal, and pivot downwardly and outwardly relative to the hub to form a relatively flat grate for charcoal. The hub has a plurality of spokes extending outwardly in a circular array. Each of the petals is generally U-shaped, although not necessarily with straight legs, and is pivotally coupled at the free ends of the "U" to an adjacent pair of the hubs spokes.

The housing may comprise a kettle forming the cooking compartment and an upstanding column coupled to an opening into a lower portion of the kettle at a juncture therewith. The charcoal grate is positioned central to the vertical axis within and vertically movable between a position within the kettle and a position within the upper end of the column adjacent the juncture of the column with the kettle. The petals of the charcoal grate are contained within the column and form a basket for the charcoal when in the lower position. The petals pivot downwardly and outwardly relative to the hub as the charcoal grate is raised into the bottom of the kettle, to form a relatively flat grate for charcoal. The outer ends of the petals engage and reside against an inner wall of the kettle as the charcoal grate is raised into the bottom of the kettle, so that the vertical position of the hub of the charcoal grate within the bottom of the kettle determines the pivoting orientation of the petals relative to the hub.

The actuator mechanism may comprise a shaft centrally disposed and vertically movable within the column and with the hub mounted on an upper end thereof. The actuator mechanism includes an actuating handle coupled to a lower end of the shaft and extending to the outside of the column. The actuator mechanism includes lower and upper stops for the actuating handle, so that the charcoal grate is positioned in the lower position when the actuating handle engages the lower stop and in the upper position when the actuating handle engages the upper stop. The actuator mechanism also includes a rod disposed within a hollow interior of the shaft and fixed at its lower end to the housing. A coil spring is disposed within the hollow interior of the shaft and provides a lifting force to the charcoal basket while it is in the lower position.

The igniting apparatus comprises at least one access hole in the column which provides access to the space within the column and below the charcoal in the basket. The access hole permits wadded up paper to be inserted therethrough and ignited to light charcoal positioned thereabove within the charcoal grate. A platform or basket holds the paper close to the underside of the charcoal basket. The access holes may also function as vent holes to allow ingress of air. The igniting apparatus may also include a propane torch igniter having a bracket detachably coupled to the housing at the access hole and having a nozzle which extends through the access hole to direct flame to the charcoal in the charcoal grate. The bracket has an upper hook and a lower tab respectively extending into upper and lower portions of the access hole to attach the bracket to the housing. The upper hook has a lip portion engaging an inner surface of the housing. Installation of the propane igniter is easily accomplished by inserting the upper hook of the bracket into the upper portion of the access hole so that the lip portion thereof engages the inner surface of the housing, and then lowering the propane igniter so that the lower tab is seated within a lower portion of the access hole. Removal of the propane igniter involves a reverse action in which the propane igniter is raised to remove the lower tab from the lower portion of the access hole, following which the lip portion of the upper hook may be disengaged from the inner surface of the housing to permit removal of the propane igniter.

The barbecue includes an ash drawer mounted at the bottom end of the column for collecting ash from the charcoal grate and from the cooking compartment. The charcoal grate is rotatable and vertically movable to dislodge ash therefrom and from the inner surface of the kettle allowing it to settle into the ash drawer. The rotational and vertical movement of the cooking grate allows safe and easy distribution of the charcoal for cooking when the charcoal grate is raised.

The barbecue may include a pair of shells pivotally joined by a handle assembly and positionable for storage on the outside of the column. The pair of shells are removable from the outside of the column and joinable together to form a chimney mounted in the lower portion of the kettle at the juncture with the column. The handle assembly is spring loaded to normally bias the pair of shells together onto the outside of the column. When the pair of shells are removed from the outside of the column and joined together and mounted in the lower portion of the kettle at the juncture with the column, they form a chimney above the charcoal basket. Such chimney, which is substantially tubular, serves to draw air through the charcoal due to convection which causes the charcoal to ignite faster. The shells are pivotally coupled along a first edge of each, and the handle assembly comprises a pair of handles, each mounted on a different one of the pair of shells adjacent the first edge thereof. The handle assembly includes a spring coupled to each of the pair of handles for biasing the pair of shells into a closed position in which second edges of each shell opposite the first edge thereof are joined together. The second edges of the pair of shells are provided with a tongue and groove interlock.

In addition to the ash drawer, the barbecue preferably includes a gate mounted within the housing above the ash drawer such that the gate is closed to close off the bottom of the lower end of the column whenever the ash drawer is removed from the lower end of the housing. A lift bar coupled to the housing beneath the ash drawer holds the ash drawer against the lower end of the housing to seal off the bottom of the lower end of the housing when the ash drawer is installed in the lower end of the housing. The gate has downwardly projecting front and rear lips. The front lip is contacted by the ash drawer to close the gate upon removal of the ash drawer. The rear lip is contacted by the ash drawer to open the gate upon installation of the ash drawer in the lower end of the housing.

BRIEF DESCRIPTION OF THE DRAWINGS

In order that the present invention may be understood, it will now be described by way of example, with reference to the accompanying drawings, in which:

FIGS. 8A, 8B and 8C are sectional views showing the ash drawer of FIG. 7 in different positions relative to a gate, at the bottom of the barbecue of FIG. 1.

DETAILED DESCRIPTION

Figure 1:
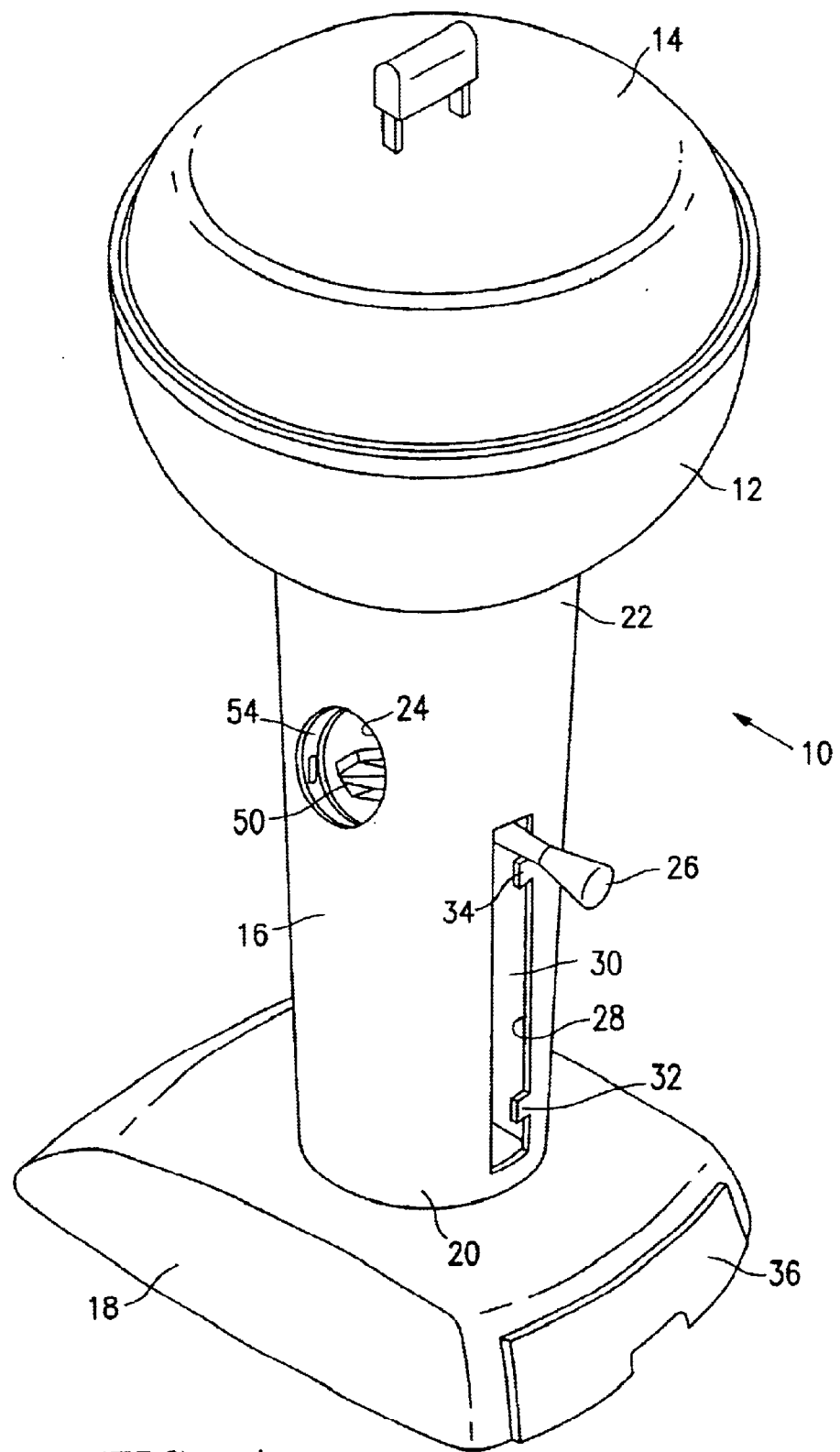
FIG. 1 is a perspective view of a quick start barbecue in accordance with the invention.

FIG. 1 shows a quick start barbecue 10 according to the invention. The barbecue 10 has a housing which includes a kettle 12 at the top, forming a cooking chamber. The kettle 12 has a removable lid 14 to provide access to the interior thereof. The kettle 12 is mounted at the upper end of a column 16 extending downwardly from the kettle 12 to a base 18 at a lower end thereof. The column 16 is partially conical in shape so as to have a diameter which increases gradually from a lower end 20 thereof at the base 18 to an upper end 22 thereof at a juncture with the kettle 12.

The column 16 has an access hole 24 in a side thereof. As described in detail hereafter, the access hole 24 provides access to a paper basket 50 inside of the column 16 so that newspaper or other combustible material can be inserted through the hole and ignited to start the charcoal within the barbecue 10. The access hole 24 also functions as a vent allowing air to enter the column and rise through the charcoal. A vent covers 54 slidably engages the inside of the column 16 to cover or uncover the access/vent holes 24. The vent cover 54 and a vent in the lid 14 (not shown) are closed after cooking is finished in order to smother the charcoal.

Also visible in FIG. 1 is an actuating handle 26 extending outwardly through a recess 28 in the side of the column 16. The actuating handle 26 forms part of an actuator mechanism 30 which functions to raise and lower a charcoal grate within the barbecue 10, as described in detail hereafter. The recess 28 is provided with lower and upper stops 32 and 34. The lower and upper stops 32 and 34 engage the actuating handle 26 to position the handle 26 in lower and upper positions, respectively. The actuating handle 26 is shown in an uppermost position in engagement with the upper stop 34, in FIG. 1.

Figure 7:
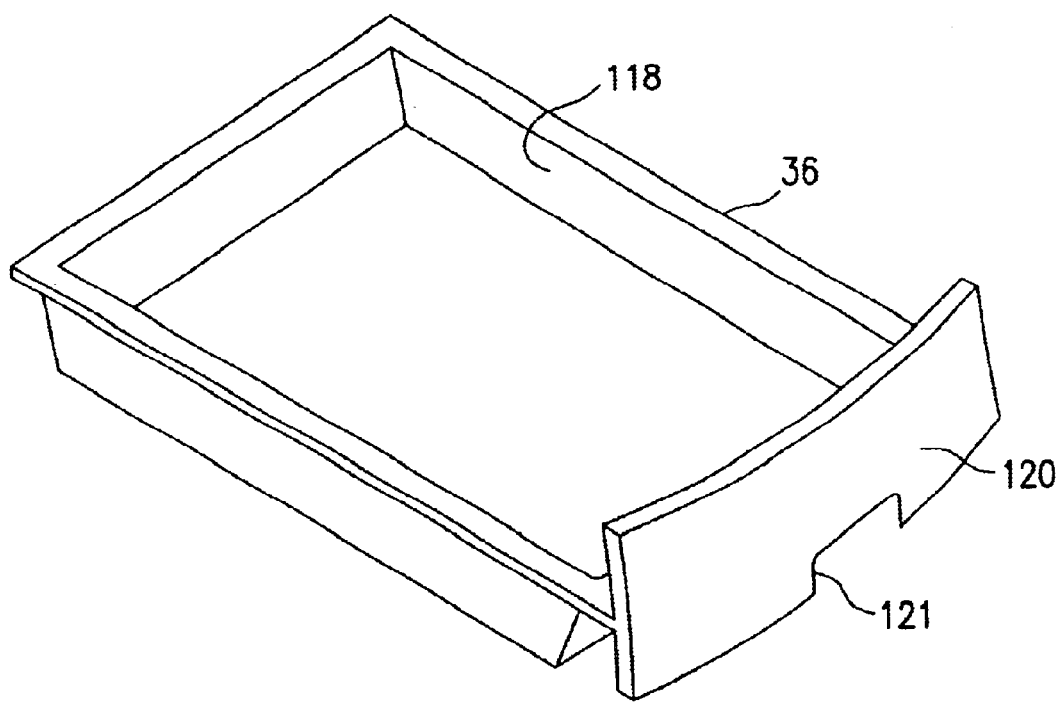
FIG. 7 is a perspective view of an ash drawer in accordance with the invention.

Also shown in FIG. 1 is an ash drawer 36 which is mounted within the base 18. The ash drawer 36 which is shown in FIG. 7 is described hereafter in conjunction with a gate within the base 18 which is shown in FIGS. 8A–8C but which is not shown in FIG. 1.

Figure 2:
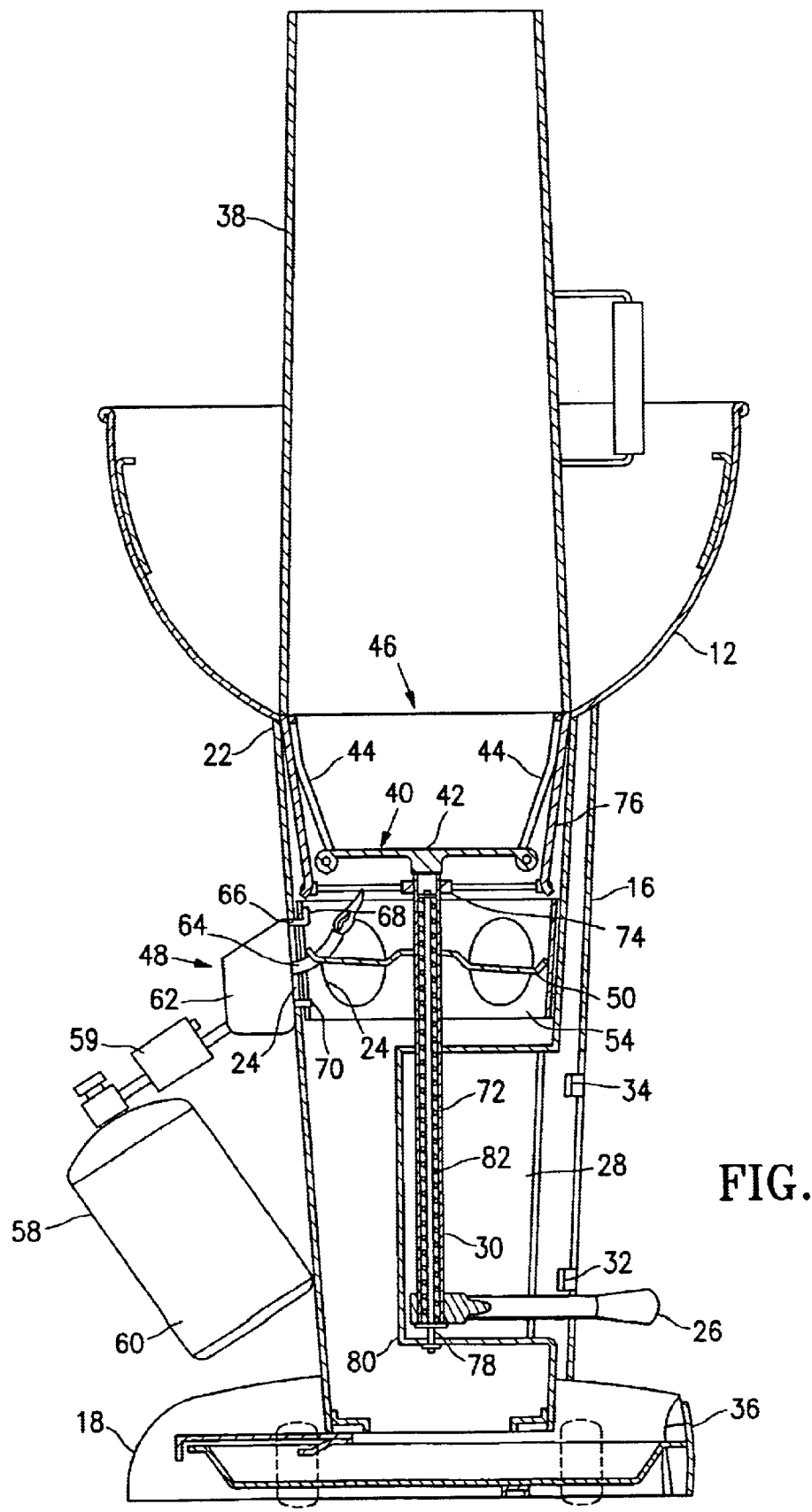
FIG. 2 is a sectional view of the barbecue of FIG. 1 with the lid removed and a pair of shells installed in a kettle at the top to form a chimney, and with a propane igniter mounted on the column of the barbecue.
Figure 3:
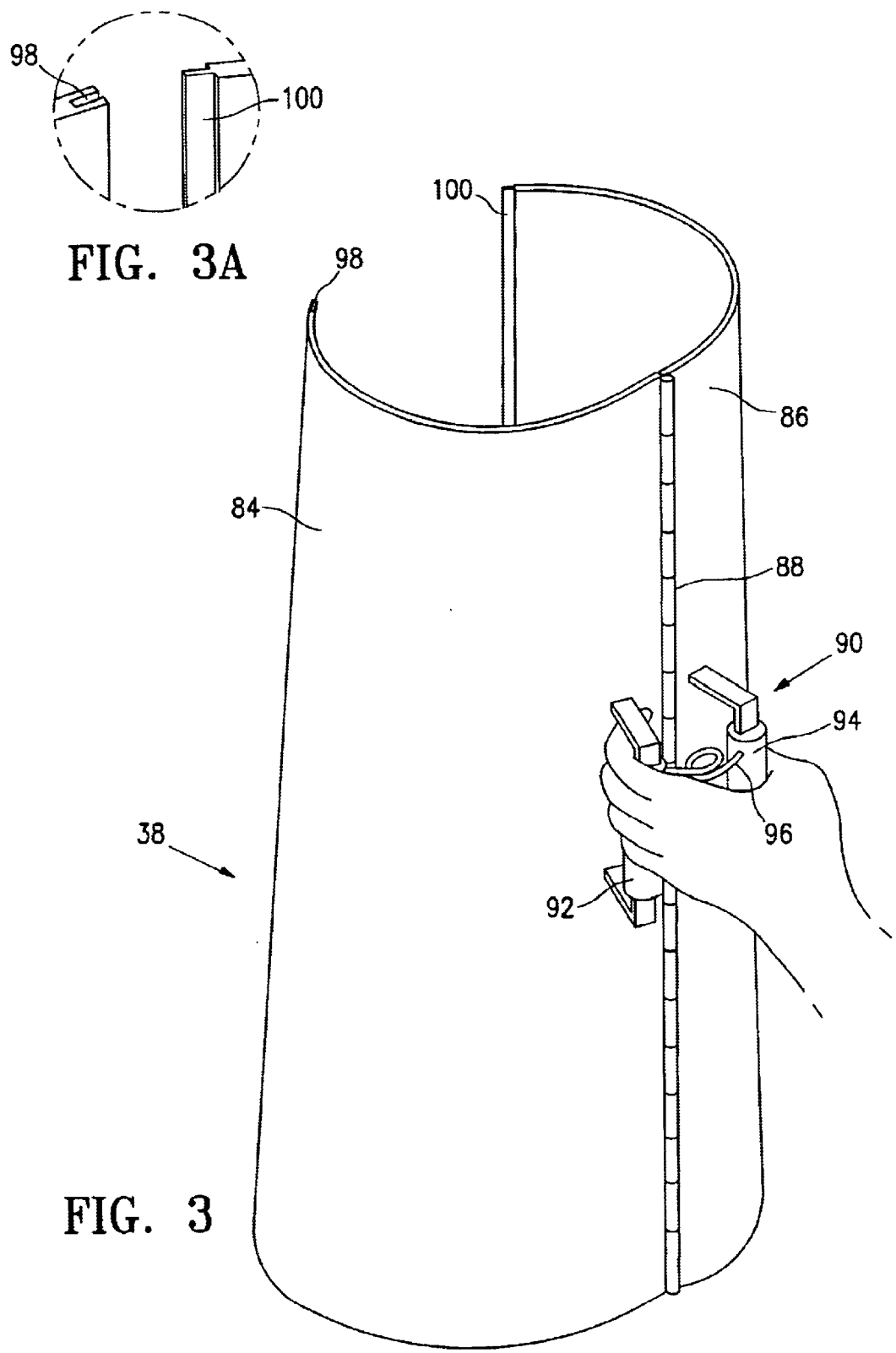
FIG. 3 is a perspective view of the shells which form the chimney shown in FIG. 2.

FIG. 2 is a sectional view of the barbecue 10 of FIG. 1. In FIG. 2, the lid 14 is removed from the kettle 12, and a chimney 38 is installed within the kettle 12 at the juncture of the bottom of the kettle 12 with the upper end 22 of the column 16. The chimney 38, which is shown and described in detail in connection with FIG. 3 is comprised of a pair of opposite, hinging shells which close together to form the tubular chimney 38. The chimney 38 is normally stored on the outside of the column 16, except when in use as shown in FIG. 2. The opposite shells of the chimney may be separated against spring resistance to enable placement around the column 16 for storage thereon.

As shown in FIG. 2, the barbecue includes a charcoal grate 40 which includes a central hub 42 having a plurality of petals 44 pivotally coupled thereto. The charcoal grate 40 is shown and described in greater detail in connection with FIG. 4. In the position of the charcoal grate 40 shown in FIG. 2, the petals 44 are pivoted upwardly relative to the hub 42 to form a basket 46 for charcoal when in such lower position.

With the charcoal grate 40 in the lower position so as to form a charcoal basket 46, as shown in FIG. 2, the basket 46 may be filled with charcoal. The charcoal is ignited using igniting apparatus 48 which includes a paper basket 50 which is a platform to hold combustible material such as newspaper close to the charcoal to be ignited.

The paper basket 50 may be used to ignite a quantity of charcoal located in the basket 46 formed by the charcoal grate 40. Sheets of newspaper or other similar flammable material are wadded up and inserted through the access holes 24 onto the paper basket 50. Matches may then be used to ignite the paper which in turn ignites and starts the charcoal within the basket 46 formed by the charcoal grate 40.

The igniting apparatus 48 alternatively includes a propane igniter 58 which includes a liquid propane (LP) tank 60 coupled to a bracket 62 having a nozzle 64 extending therefrom. Note that the propane igniter 58 in FIG. 2 is shown opposite the recess 28 for illustrative purposes only. The bracket 62 has an upper hook 66 which extends therefrom and has a lip portion 68. The bracket 62 also has a lower prong 70 extending therefrom.

To install the propane igniter 58 on the barbecue 10, the upper hook 66 of the bracket 62 is first inserted into an upper portion of the access hole 24 where the lip portion 68 thereof is engaged with the inside of the column 16. The propane igniter 58 is then lowered so as to insert the lower prong 70 into a lower portion of the access hole 24, until the bracket 62 is seated against the outside of the column 16. Propane gas from the tank 60 is ignited, and forms a flame at the nozzle 64. This ignites and starts a quantity of charcoal loaded within the basket 46 of the charcoal grate 40. The propane igniter 58 may have a sparking device 59 to light the propane.

The propane igniter 58 is easily removed from the barbecue 10 simply by reversing the installation procedure. The propane igniter 58 is rotated upwardly so as to remove the lower prong 70 from the lower portion of the access hole 24. This enables the upper hook 66 with its lip portion 68 to be disengaged from and removed from the access hole 24, thus completing removal of the propane igniter 58 from the barbecue 10.

The charcoal grate 40 is positioned using the actuator mechanism 30. As shown in FIG. 2, the actuating handle 26 is coupled to a hollow shaft 72 which extends upwardly from the actuating handle 26 to an upper end thereof which is coupled to the central hub 42 of the charcoal grate 40. The upper end of the hollow shaft 72 extends through a bushing 74 fixedly mounted to the column 16. A substantially cylindrical heat shield 76 is fixedly mounted inside the upper end of the column 16. The bushing 74 permits vertical movement of the hollow shaft 72 therethrough.

The bottom end of the rod 78 is mounted to a wall 80 of the recess 28. The rod 78 extends through the interior of the hollow shaft 72. The top of the rod 78 serves as a mounting point for the upper end of extension coil spring 82. The lower end of the coil spring 82 provides a lifting force to the shaft 72 and thus the charcoal grate 40 in order to move the charcoal into the cooking position.

With the charcoal grate 40 positioned in its lowermost position with the actuating handle 26 engaging the lower stop 32, as shown in FIG. 2, the charcoal grate 40 resides just above the bushing 74, and the coil spring 82 is in an extended state. As described in detail hereafter, the actuating handle 26 is disengaged from the lower stop 32 and is raised along the recess 28, moving the hollow shaft 72 upwardly through the bushing 74 so as to raise and gradually unfold the charcoal grate 40 until eventually the charcoal grate 40 forms a relatively flat grate and the charcoal is positioned inside the kettle 12 just below a cooking grate. This feature in accordance with the invention enables the charcoal to be readily transported upwardly into a location where it is ready for use on a relatively flat grate. This is made possible by the charcoal grate 40 which folds to form the basket 46 when in the lower position and which unfolds to form a relatively flat grate when in the upper position. When the charcoal grate 40 is in the lowermost position as shown in FIG. 2 and forms the basket 46, charcoal loaded into the basket 46 and ignited by the igniting apparatus 48 starts and burns very quickly by being held in a confined manner and being subject to an updraft due to convection. The chimney 38 further serves to increase the convection and accelerate the process of igniting the charcoal. When the coals are ready for cooking, the chimney 38 is removed from the kettle 12 and set aside. Using the actuating handle 26, the charcoal grate 40 is then raised into the bottom of the kettle 12, where it unfolds into a relatively flat grate for holding the charcoal beneath a cooking grate within the kettle 12. The actuating handle 26 may be moved rotationally and vertically to evenly distribute the charcoal for cooking.

The chimney 38 is shown in FIG. 3. As shown therein, the chimney 38 is comprised of opposite mating shells 84 and 86 pivotably coupled along a first edge of each at a pivot joint 88. A spring-loaded handle assembly 90 includes a pair of handles 92 and 94 coupled to the first edges of the shells 84 and 86 respectively. As shown in FIG. 3, the handles 92 and 94 form a convenient means of grasping the shells 84 and 86 to transport the chimney 38 between the outside of the column 16 and the inside of the kettle 12. A spring 96 attached to and extending between the handles 92 and 94 normally biases the shells 84 and 86 into a closed position in which second edges of the shells 84 and 86 opposite the first edges are joined together. The second edges of the shells 84 and 86 are provided with a groove 98 and a tongue 100, respectively, for interlocking engagement when the shells 84 and 86 are closed together.

By simply squeezing the handles 92 and 94 together, against the resistance of the spring 96, the opposite shells 84 and 86 pivot into the open position. Because the handles 92 and 94 are relatively close to each other, it is possible using a single hand to grasp both handles 92 and 94 and squeeze them together to open the shells 84 and 86, while at the same time removing the shells 84 and 86 from the outside of the column 16. By releasing some of the pressure on the handles 92 and 94, the opposite shells 84 and 86 then join together under the urging of the spring 96, and the chimney 38 formed by the shells 84 and 86 may then be placed within the kettle 12 in the position shown in FIG. 2. When it is desired to remove the chimney 38 from the kettle 12, the handles 92 and 94 are grasped and the shells 84 and 86 are lifted out of the kettle 12. By then squeezing the handles 92 and 94 toward each other, the shells 84 and 86 open sufficiently so that they may be placed over the outside of the column 16. When the handles 92 and 94 are released, the urging of the spring 96 biases the opposite shells 84 and 86 toward one another to hold them in place on the outside of the column 16.

Figure 4:
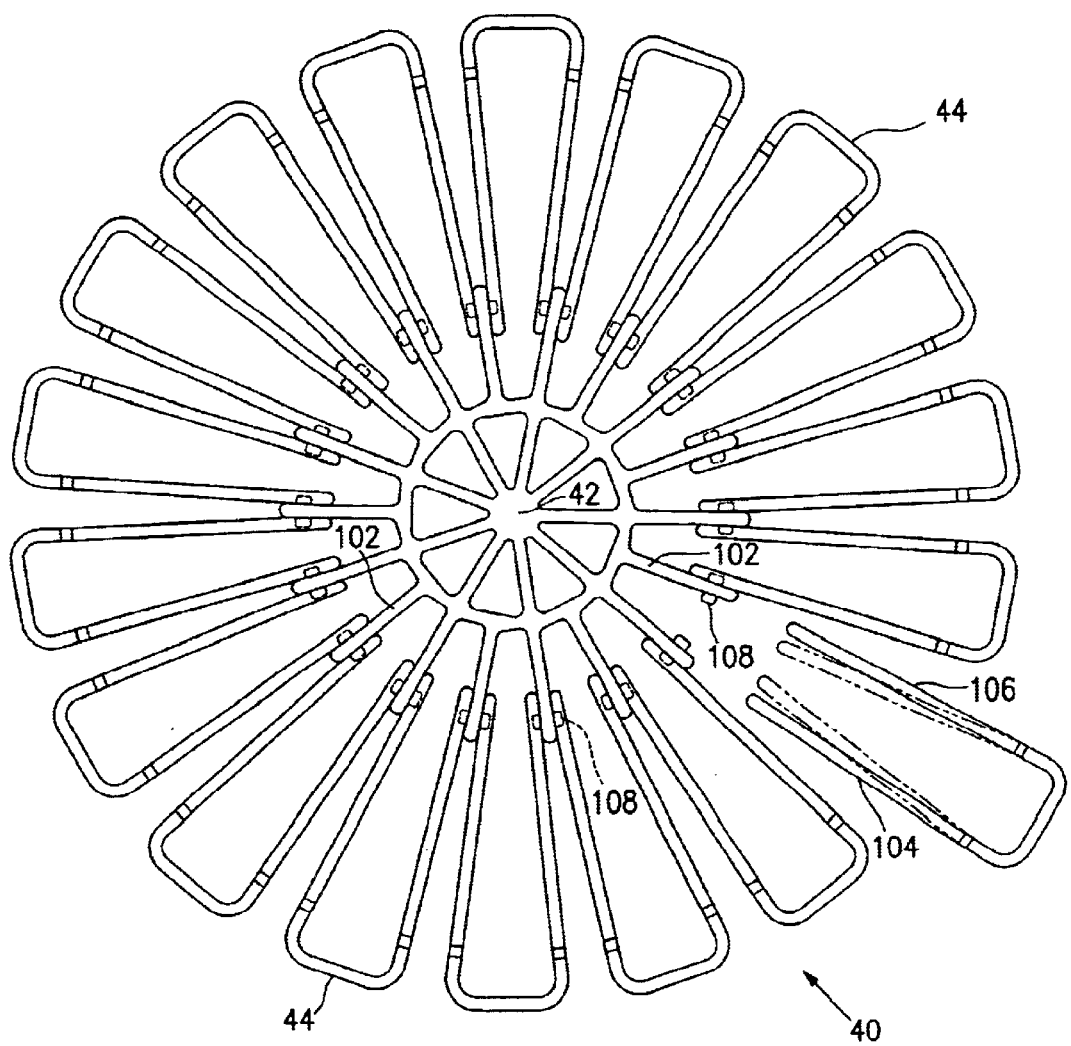
FIG. 4 is a plan view of the charcoal grate of the barbecue of FIG. 1 showing the details of the central hub with spokes extending outwardly in a circular array and the U-shaped petal-like structure with opposite pairs of legs pivotably coupled to adjacent pairs of the spokes.

FIG. 4 is a detailed view of the charcoal grate 40. As shown therein, the central hub 42 includes a plurality of spokes 102 which extend outwardly in a circular array. Each of the petals 44 is comprised of a generally U-shaped element having opposite pairs of legs 104 and 106 pivotably coupled to an adjacent pair of the spokes. Each leg 104 and 106 is coupled to one of the spokes 102 by a pivot pin 108. The ends of each petal may be squeezed together as indicated to assemble the grate at the factory or for the user to replace individual petals.

The pivot pins 108 enable the petals 44 to undergo pivoting movement relative to the spokes 102 of the hub 42. When the charcoal grate 40 is in its lowermost position shown in FIG. 2, the petals 44 are pivoted upwardly relative to the hub 42 to form the basket 46 for the charcoal. As the charcoal grate 40 is then raised from this position, the petals 44 swing downwardly relative to the hub 42 until they form a relatively flat charcoal grate with the hub 42, as described hereafter.

Figure 5:
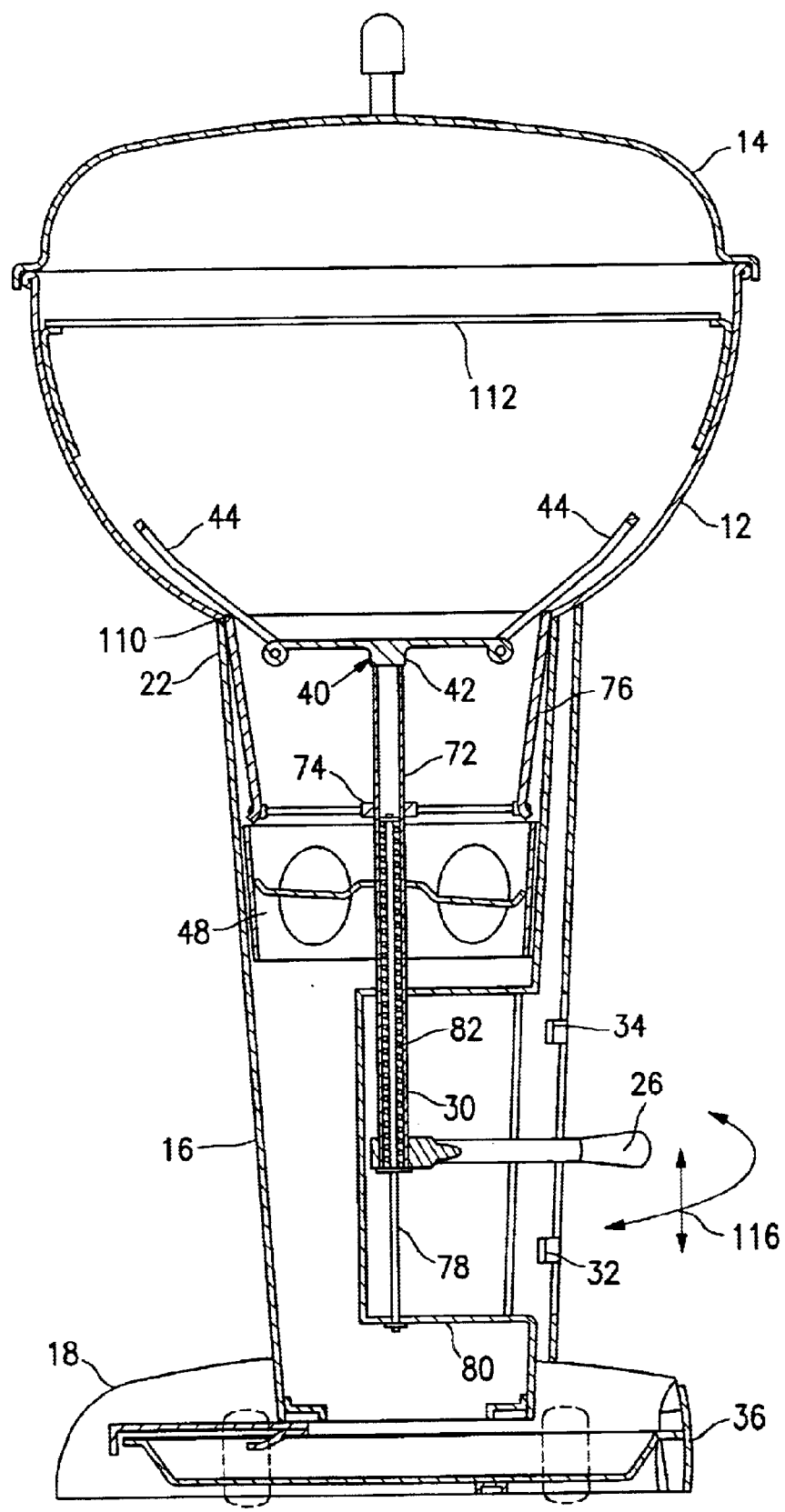
FIG. 5 is a sectional view of the barbecue of FIG. 1 with the actuator handle partly raised from the position shown in FIG. 2 so as. to move the charcoal grate into and partly unfold the charcoal grate within the kettle.

FIG. 5 is a cross-sectional view of the barbecue 10 with the charcoal grate 40 raised somewhat from its lowermost position in FIG. 2. This action is brought about by disengaging the actuating handle 26 from the lower stop 32 and moving it upwardly. Such action slides the hollow shaft 72 upwardly along the rod 78. This movement is aided by tension coil spring 82 residing within the hollow shaft 72. The hollow shaft 72 moves upwardly through the bushing 74, raising the hub 42 of the charcoal grate 40 above the bushing 74 and the bottom of the heat shield 76.

As previously described, the upper end 22 of the column 16 forms a juncture with an open lower end of the kettle 12. As the charcoal grate 40 is raised, the petals 44 slide along the juncture 110 until the hub 42 of the charcoal grate 40 begins to enter the lower open end 110 of the kettle 12. When this happens, the petals 44 are free to pivot downwardly relative to the hub 42 by a substantial amount so as to begin to open up the basket 46 previously formed by the charcoal grate 40. As shown in FIG. 5, the petals 44 are in a partially opened position.

As also shown in FIG. 5, a cooking grate 112 is mounted within the kettle 12 just below the lid 14 of the kettle. Food placed on the cooking grate 112 is cooked by the charcoal when the charcoal grate 40 is raised into its uppermost position, as described hereafter.

Figure 6:
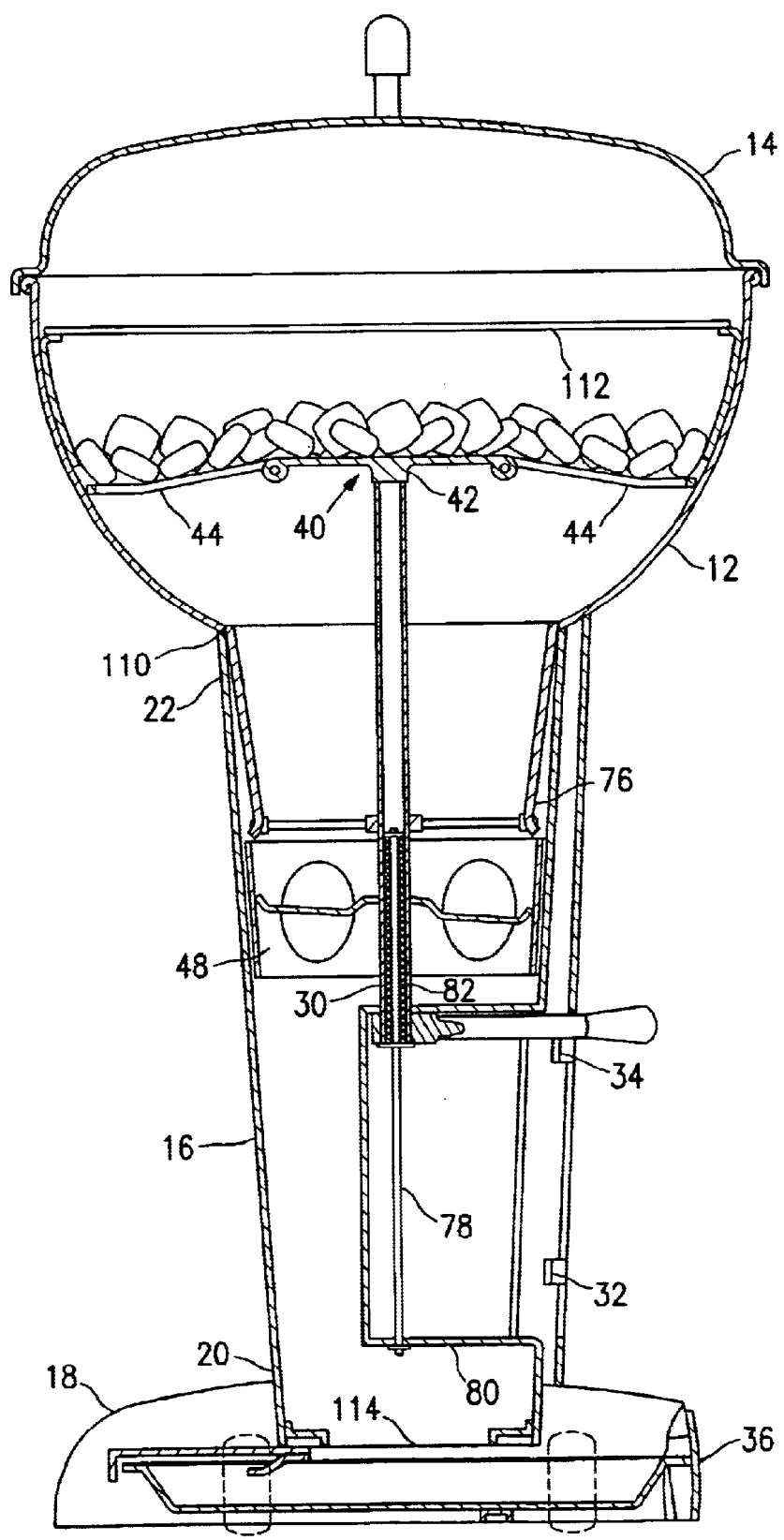
FIG. 6 is a sectional view similar to FIG. 5 but with the actuator handle raised to the uppermost position so as to completely unfold the charcoal grate to form a flat grate for the charcoal.

FIG. 6 is a cross-sectional view of the barbecue 10 similar to that of FIG. 5, but with the charcoal grate 40 raised to its uppermost position. The actuating handle 26 has been raised into engagement with the upper stop 34, and the coil spring 82 is relaxed even further compared with the case in FIG. 5. The hollow shaft 72 is moved still further into the bottom of the kettle 12, allowing the petals 44 to pivot downwardly even further so that they combine with the hub 42 to form a relatively flat grate for the charcoal.

FIG. 6 shows a quantity of charcoal on the charcoal grate 40. The charcoal is positioned below the cooking grate 112 in a desired position for cooking food placed upon the cooking grate 112.

As the charcoal burns and ash begins to form, the open spaces within the charcoal grate shown in FIG. 4 permit such ash to fall through the charcoal grate 40 into the upper open end of the column 16. The bottom of the heat shield 76 is open, allowing such ash to fall therethrough to the lower end 20 of the column 16. The lower end 20 of the column 16 has an opening 114 therein, through which the ash falls into the ash drawer 36 within the base 18. In this fashion, the ash drawer 36 continues to collect ash which falls from the charcoal grate 40 as the cooking process proceeds. Eventually, the ash drawer 36 is removed from the base in order to permit disposal of the ash therein.

After cooking is completed, if partially burned charcoal remains on the charcoal grate 40, the charcoal grate 40 can be rotated and raised and lowered to a limited extent by manipulating the actuating handle 26, thus sifting ash from the remaining unburned charcoal. The ash falls through the column 16 and into the ash drawer 36. An arrow 116 shown in FIG. 5 illustrates such rotational and vertical motion of the actuating handle 26 to rotate and dislodge ash from the charcoal grate 40.

If ash has collected on the bottom of the kettle 12, the charcoal grate 40 can be lowered part way and then rotated to dislodge the ash, allowing it to fall through the column 16 and into the ash drawer 36 below. Lowering the charcoal grate all the way causes the petals 44 to pivot upwardly to the extent that they form the basket 46. When the barbecue 10 is next used, charcoal is poured into the basket 46 at lease up to the juncture 110 of the column 16 and the kettle 12.

The ash drawer 36 is shown in FIG. 7. As shown therein, the drawer 36 is of generally rectangular configuration and has an open upper end 118 through which the ash falls for deposit within the drawer 36. The front end of the ash drawer 36 has a curved face 120 which fits flush with the base 18 of the barbecue 10 when the ash drawer 36 is in the closed position. An opening 121 facilitates grasping thereof for outward pulling to remove the ash drawer 36 from the base 18 of the barbecue 10.

FIG. 8A shows the ash drawer 36 in the closed position within the base 18. As such, the opening 114 at the bottom of the column 16 communicates with the upper open end 118 of the ash drawer 36 so that ash descending through the column 16 is free to fall into and deposit within the ash drawer 36. The ash drawer 36 is designed to hold at least two uses worth of ash. However, the lower end 20 of the column 16 is capable of storing still more ash, up to the bottom edges of the access holes 24. A lift bar 122 mounted within the base 18 at the bottom thereof resides against the bottom of the ash drawer 36. The lift bar 122 serves to hold the ash drawer 36 against the structure at the lower end 20 of column 16 at the opening 114 therein. This provides an air seal, which is required in order to smother the charcoal.

The ash drawer 36 operates in conjunction with a gate 124. As shown in FIG. 8A, the gate 124 is in an open position when the ash drawer 136 is in the closed position within the base 18. This leaves the bottom end of the column 16 open so that ash falling through the column 16 can fall freely into the ash drawer 36. However, opening of the ash drawer 36 causes the gate 124 to close off the open lower end of the column 16, thereby preventing ash from falling onto the floor or ground beneath the barbecue 10 when the ash drawer 36 is removed. The gate 124 has downwardly hanging front and rear lips 126 and 128.

As shown in FIG. 8B, as removal of the ash drawer 36 is begun, a rear portion of the ash drawer 36 contacts the front lip 126 of the gate 124. Further outward movement of the ash drawer 36 slides the gate 124 into the closed position so as to close off the open lower end of the column 16. In this position, the closed gate 124 prevents ash from falling from the column 16 onto the ground or floor below the barbecue 10. Once the ash drawer 36 passes the lift bar 122, the back end thereof may drop so as to clear the front lip 126, thereby permitting removal of the ash drawer 36 from the base 18.

Upon reinsertion of the ash drawer 36, the rear edge thereof first passes under the front lip 126 of the grate 124. Upon further insertion, the rear portion of the ash drawer 36 is lifted by the lift bar 122. As the ash drawer 36 is moved into the closed position, the rear edge thereof engages the rear lip 128 of the gate 124, thereby sliding the gate 124 into a position in which the bottom end of the column 16 is again opened and the opening 114 at the lower end 20 of the column 16 communicates with the upper open end 118 of the ash drawer 36.

The front lip 126 of the gate 124 is spring loaded so that if the front lip 126 is contacted by the drawer 36 as the drawer is being withdrawn, it will cause the gate 124 to close, but if the front lip 126 is contacted by the drawer 36 as the drawer 36 is being inserted, the front lip 126 will flex, allowing the rear edge of the drawer 36 to bypass the front lip 126.

While specific embodiments have been illustrated and described, numerous modifications are possible without departing from the spirit and scope of the invention, and the scope of protection is only limited by the scope of the accompanying claims.

What is claimed is:

1. A barbecue comprising the combination of:

a housing having a cooking compartment therein;

a cooking grate mounted in the cooking compartment;

a foldable charcoal grate positioned below the cooking grate and moveable between a lower position in which the charcoal grate is folded to form a basket for holding charcoal in a compact arrangement and an upper position in which the charcoal grate is unfolded to form a relatively flat grate for holding charcoal in a spread-out arrangement; and an actuator mechanism for selectively moving the charcoal grate between the lower and upper positions.

2. A barbecue according to claim 1, wherein the charcoal grate comprises a central hub and a plurality of petal-like structures pivotably coupled to the hub and extending outwardly therefrom in a circular array, wherein the petal-like structures may pivot upwardly relative to the hub to form the basket for charcoal and downwardly and outwardly relative to the hub to form the relatively flat grate for charcoal.

3. A barbecue according to claim 2, wherein the hub has a plurality of spokes extending outwardly in a circular array and wherein each of the petal-like structures is generally U-shaped and wherein each U-shaped petal-like structure has free ends pivotably coupled to one of the spokes.

4. A barbecue according to claim 2, wherein the housing comprises a kettle forming the cooking compartment and an upstanding column coupled to and opening into a lower portion of the kettle at a juncture therewith, and wherein the charcoal grate is positioned about a central vertical axis within the barbecue and vertically moveable wherein the lower position of the charcoal grate is within an upper end of the column adjacent the juncture of the column with the kettle and wherein the upper position of the charcoal grate is within the kettle.

5. A barbecue according to claim 4, wherein outer ends of the petal-like structures engage and reside against an inner wall of the kettle as the charcoal grate is vertically raised into the bottom of the kettle so that the vertical position of the hub of the charcoal grate within the bottom of the kettle determines the pivoting orientation of the petal-like structure relative to the hub.

6. A barbecue according to claim 4, wherein the actuator mechanism comprises a shaft which is rigidly coupled to the vertically moveable charcoal grate hub and further comprises an actuating handle which is rigidly coupled to a lower end of the shaft and which extends outside of the column.

7. A barbecue according to claim 6, wherein the actuator mechanism includes lower and upper stops for the actuating handle, the charcoal grate being in the lower position when the actuating handle engages the lower stop and in the upper position when the actuating handle engages the upper stop.

8. A barbecue according to claim 6, wherein the actuator mechanism further comprises a coil spring disposed within a hollow interior of the actuator mechanism shaft, this spring being coupled at one end to the vertically moveable charcoal grate and an opposite end to the barbecue housing in such a way that the spring imparts a lifting force to the charcoal grate while it is in the lower position.

9. A barbecue according to claim 1, further comprising an access hole in the barbecue housing allowing access to a space within the housing and below the charcoal grate in the lower position and further comprising a platform in the space for holding combustible material close to charcoal that is to be ignited.

10. A barbecue according to claim 1, further comprising a flammable gas torch positioned so that a flame from this torch is directed at charcoal to be ignited in the charcoal grate basket while the charcoal grate is in the lower position.

11. A barbecue according to claim 10 wherein the barbecue further comprises an access hole in the barbecue housing creating a passageway open to the bottom of the charcoal grate while it is in the lower position and wherein the torch includes a bracket adapted to removably attach to the housing at the access hole.

12. A barbecue according to claim 11 wherein the bracket has an upper hook and a lower tab respectively extending into upper and lower portions of the access hole to attach the bracket to the housing, the upper hook having a lip portion engaging an inner surface of the housing.

13. A barbecue according to claim 1, further including an ash drawer mounted at a bottom end of the housing for collecting ash created by burning of charcoal in the cooking compartment.

14. A barbecue according to claim 13, wherein the charcoal grate is rotatably and vertically moveable to dislodge ash from partially burned charcoal and from an inner surface of the cooking compartment.

15. A barbecue according to claim 1, wherein the housing comprises a kettle forming the cooking compartment, and an upstanding column coupled to and opening into a lower portion of the kettle at a juncture therewith, and further including a chimney of substantially tubular shape mounted in the lower portion of the kettle at the juncture with the column.

16. A barbecue according to claim 15, wherein the chimney is formed by a pair of shells in the form of a tube split in half along its axis, the pair of shells being pivotably joined along a first edge and capable of mating along a second edge to form a tube, the chimney being adapted to be stored wrapped around the column while not in use.

17. A barbecue according to claim 16, wherein the pair of shells is spring loaded to normally bias the pair of shells together.

18. A barbecue comprising the combination of:
a housing having an access hole therein;
a charcoal grate positioned within the housing; and
a flammable gas torch having a bracket which detachably couples to the housing at the access hole and having a nozzle to direct a flame at the charcoal grate;
wherein the bracket has an upper hook and a lower tab respectively extending into upper and lower portions of the access hole to attach the bracket to the housing, the upper hook having a lip portion engaging an inner surface of the housing.

19. A barbecue comprising the combination of:
a kettle;
an upstanding column coupled to and opening into a lower portion of the kettle at a juncture therewith;
a charcoal basket disposed below the juncture of the kettle and the upstanding column; and
a pair of shells pivotably joined together and positionable for storage on the outside of the column, the pair of shells being removable from the outside of the column and capable of being assembled to form a chimney which may be mounted in the lower portion of the kettle at the juncture with the column and above the charcoal basket.

20. A barbecue in accordance with claim 19, wherein the pair of shells form a substantially tubular structure.

21. A barbecue in accordance with claim 19, wherein the pair of shells are pivotably coupled along a first edge of each of the shells, and the handle assembly comprises a pair of handles, each mounted on a different one of the pair of shells adjacent the first edge thereof.

22. A barbecue in accordance with claim 21, wherein the handle assembly includes a spring coupled to each of the pair of handles for biasing the pair of shells into a closed position in which the second edges of each opposite the first edges are joined together.

23. A barbecue in accordance with claim 22, wherein the second edges of the pair of shells are provided with a tongue and groove interlock.

24. A barbecue comprising the combination of:
a housing;
a charcoal grate mounted in the housing;
an ash drawer mounted at a lower end of the housing beneath the charcoal grate;
a gate mounted within the housing above the ash drawer, the gate being closed to close off the bottom of the lower end of the housing whenever the ash drawer is removed from the lower end of the housing; and
a lift bar coupled to the housing beneath the ash drawer for holding the ash drawer against the lower end of the housing to seal off the bottom of the lower end of the housing when the ash drawer is installed in the lower end of the housing.

25. A barbecue in accordance with claim 24, wherein the gate has downward hanging front and rear lips, the front lip being contacted by the ash drawer to close the gate upon removal of the ash drawer, and the rear lip being contacted by the ash drawer to open the gate upon installation of the ash drawer in the lower end of the housing.

26. A barbeque in accordance with claim 25, wherein the front lip yields to forces imparted by the installation of the ash drawer in the event that the ash drawer contacts the front lip during installation, such that the ash drawer may bypass the front lip in the event it is contacted during installation.

* * * * *